(12) United States Patent
Tanaka

(10) Patent No.: US 12,330,531 B2
(45) Date of Patent: Jun. 17, 2025

(54) BATTERY MANAGEMENT DEVICE AND METHOD

(71) Applicant: TOYOTA JIDOSHA KABUSHIKI KAISHA, Toyota (JP)

(72) Inventor: Hiromasa Tanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 575 days.

(21) Appl. No.: 17/864,158

(22) Filed: Jul. 13, 2022

(65) Prior Publication Data

US 2023/0053822 A1 Feb. 23, 2023

(30) Foreign Application Priority Data

Aug. 18, 2021 (JP) .................... 2021-133278

(51) Int. Cl.
  *H02J 7/00* (2006.01)
  *B60L 58/12* (2019.01)
  *B60L 58/21* (2019.01)
  *B60L 58/22* (2019.01)
  *H01M 10/44* (2006.01)

(52) U.S. Cl.
  CPC ............ *B60L 58/22* (2019.02); *B60L 58/12* (2019.02); *B60L 58/21* (2019.02); *H01M 10/441* (2013.01); *H01M 2220/20* (2013.01)

(58) Field of Classification Search
  USPC ........................................................ 320/124
  See application file for complete search history.

(56) References Cited

U.S. PATENT DOCUMENTS

| | | | | |
|---|---|---|---|---|
| 12,040,460 | B2 * | 7/2024 | Books .................... | B60L 53/62 |
| 2010/0090649 | A1 * | 4/2010 | Sardat .................. | H01M 10/482 320/118 |
| 2010/0190041 | A1 * | 7/2010 | Hou ..................... | H01M 10/482 429/61 |
| 2014/0225622 | A1 * | 8/2014 | Kudo .................... | B60L 7/14 324/433 |
| 2020/0403420 | A1 * | 12/2020 | Nagase ............... | H01M 10/482 |
| 2023/0058220 | A1 * | 2/2023 | Kaneko ................ | B60L 58/22 |

FOREIGN PATENT DOCUMENTS

| | | |
|---|---|---|
| JP | 2015-80334 A | 4/2015 |
| JP | 2017-34887 A | 2/2017 |
| JP | 2020-156119 A | 9/2020 |
| WO | 2015/056068 A1 | 4/2015 |

* cited by examiner

*Primary Examiner* — Samuel Berhanu
(74) *Attorney, Agent, or Firm* — Oliff PLC

(57) ABSTRACT

A battery management device that manages a battery includes: multiple voltage detection circuits each connected to a corresponding one of a plurality of battery cells; and multiple discharge circuits each connected to a corresponding one of the battery cells. The battery management device causes the battery cell whose voltage difference from a reference voltage is equal to or greater than a predetermined first threshold and less than a second threshold that is greater than the first threshold to be discharged while a system of the vehicle is stopped, and causes the battery cell whose voltage difference is equal to or greater than the second threshold to be discharged at least either while the system is stopped or while the system is in operation.

7 Claims, 4 Drawing Sheets

BATTERY MANAGEMENT DEVICE AND METHOD

CROSS-REFERENCE TO RELATED APPLICATION

This application claims priority to Japanese Patent Application No. 2021-133278 filed on Aug. 18, 2021, incorporated herein by reference in its entirety.

BACKGROUND

1. Technical Field

The present disclosure relates to battery management devices and methods for managing a battery including a plurality of battery cells and mounted on a vehicle.

2. Description of Related Art

Conventionally, a management device that manages an energy storage module (battery) is known in the art. This energy storage module (battery) includes multiple cells connected in series and transfers electric power with a traction motor of a vehicle (see, e.g., Japanese Unexamined Patent Application Publication No. 2020-156119 (JP 2020-156119 A)). This management device includes a voltage detection circuit, a plurality of discharge circuits, and a control unit. The voltage detection circuit is connected to each node of the cells via a plurality of voltage detection lines, and detects the voltage of each cell. Each discharge circuit is provided between adjacent two voltage detection lines, and is connected in parallel with a corresponding one of the cells. The control unit performs equalization control of controlling the discharge circuits based on the voltages detected by the voltage detection circuit and equalizing the states of charge (SOCs) (voltages) of the cells. The control unit performs the equalization control in a first mode before or during charging of the energy storage module by external charging equipment. In the first mode, the control unit equalizes the actual chargeable capacities of the cells based on the current full charge capacity and detected voltage of each cell. The control unit performs the equalization control in a second mode before the vehicle starts running on the power from the traction motor or while the vehicle is running on the power from the traction motor (before or during discharging of the cells). In the second mode, the control unit equalizes the actual releasable capacities of the cells based on the current full charge capacity and detected voltage of each cell.

SUMMARY

In the above conventional management device, when a current from a cell flows through a discharge circuit due to the equalization control, a voltage drop occurs in voltage detection lines due to the electrical resistance of the voltage detection lines. Due to, for example, the variation in temperature characteristics among the voltage detection lines and the variation in resistance among the discharge circuits, a current flowing through the discharge circuit and the amount of voltage drop in the voltage detection lines also vary among the discharge circuits and the voltage detection lines, respectively. It is therefore not easy to reduce a voltage detection error due to the voltage drop in the voltage detection lines by correction. In the above management device, the voltage detection accuracy of the cell decreases due to the voltage drop. When, as in the vehicle including the above management device, the equalization control is performed while the energy storage module is being charged with the electric power from the external charging equipment or while the energy storage module is being discharged and the vehicle is running on the power from the traction motor, charging control of the energy storage module, control of the traction motor (discharge control), etc. may not be properly performed due to the reduced voltage detection accuracy.

The present disclosure provides equalizing the voltages of a plurality of battery cells while reducing the influence of reduction in voltage detection accuracy of the battery cells.

A battery management device of one aspect of the present disclosure is a battery management device that manages a battery including a plurality of battery cells and mounted on a vehicle. The battery management device includes: multiple voltage detection circuits each connected to a corresponding one of the battery cells via a pair of voltage detection lines, and each configured to detect a voltage of the corresponding battery cell; multiple discharge circuits each connected to a corresponding one of the battery cells via the pair of voltage detection lines, and each configured to discharge the corresponding battery cell; a voltage difference acquisition unit configured to acquire, for each of the battery cells, a voltage difference between the voltage of the battery cell detected by a voltage detection circuit and a reference voltage; and a cell balancing control unit configured to cause the battery cell with the voltage difference equal to or greater than a predetermined first threshold and less than a second threshold that is greater than the first threshold to be discharged by a corresponding discharge circuit while a system of the vehicle is stopped, and configured to cause the battery cell with the voltage difference equal to or greater than the second threshold to be discharged by the corresponding discharge circuit at least either while the system of the vehicle is stopped or while the system of the vehicle is in operation.

The battery management device of the present disclosure includes multiple voltage detection circuits each connected to a corresponding one of a plurality of battery cells, and multiple discharge circuits each connected to a corresponding one of the battery cells. A voltage detection circuit and a discharge circuit that correspond to one battery cell share a pair of voltage detection lines. Therefore, when a battery cell is discharged by a corresponding discharge circuit to reduce the voltage of the battery cell to the reference voltage, a voltage drop occurs in a corresponding pair of voltage detection lines due to the electrical resistance of each voltage detection line, and the voltage detection accuracy of the battery cell decreases due to the voltage drop. Based on this, the cell balancing control unit causes the battery cell whose voltage difference between the voltage of the battery cell and the reference voltage acquired by the voltage difference acquisition unit is equal to or greater than the predetermined first threshold and less than the second threshold that is greater than the first threshold to be discharged by the corresponding discharge circuit while the system of the vehicle is stopped. Accordingly, the opportunity to discharge the battery cell having a relatively small voltage difference from the reference voltage by the discharge circuit is limited to while the system of the vehicle is stopped such as when the vehicle is not in use or when the battery is not charged using external charging equipment. This reduces the influence of reduction in voltage detection accuracy of the battery cell while the system of the vehicle is in operation. The cell balancing control unit causes the battery cell whose voltage difference is equal to or greater than the second threshold to be discharged by the corresponding discharge circuit at least either while the system of the vehicle is stopped or while the system of the vehicle is in operation. This configuration provides enough opportunities to discharge the battery cell having a relatively large voltage difference from the reference voltage, so that the voltages of the battery cells can be equalized. The battery management device of the present disclosure can thus equalize the voltages of multiple battery cells while reducing the influence of reduction in voltage detection accuracy of the battery cells.

In the battery management device of the above aspect, the cell balancing control unit may be configured to cause the battery cell with the voltage difference equal to or greater than the second threshold to be discharged by the discharge circuit in such a way that a discharge time of the battery cell is longer as the voltage difference is larger. This can reduce the chance that discharging of the battery cell by the discharge circuit and the voltage detection of the voltage detection circuit will be performed at the same time (in parallel) while the system of the vehicle is in operation, and can satisfactorily reduce the influence of reduction in voltage detection accuracy of the battery cell.

In the battery management device of the above aspect, the voltage detection circuit may be configured to detect the voltage of the corresponding battery cell in a predetermined period, and the cell balancing control unit may be configured to cause the battery cell with the voltage difference equal to or greater than the second threshold and less than a third threshold that is greater than the second threshold to be discharged by the discharge circuit when the voltage detection circuit is not detecting the voltage while the system of the vehicle is in operation, and may be configured to cause the battery cell with the voltage difference equal to or greater than the third threshold to be discharged by the discharge circuit while the system of the vehicle is in operation regardless of whether the voltage detection circuit is detecting the voltage. This configuration can minimize the influence of reduction in voltage detection accuracy of the battery cell when causing the battery cell whose voltage difference from the reference voltage is equal to or greater than the second threshold to be discharged by the discharge circuit while the system of the vehicle is in operation, and can facilitate equalization of the battery cells.

In the battery management device of the above aspect, the voltage detection circuit may include a resistor connected in series with the battery cell, a capacitor connected in parallel with the battery cell, and a voltage sensor that detects a voltage between terminals of the capacitor, and the cell balancing control unit may be configured to cause the battery cell with the voltage difference equal to or greater than the second threshold and less than the third threshold to be discharged by the discharge circuit from when voltage detection of the voltage detection circuit ends until before the voltage detection circuit starts the voltage detection. Accordingly, the capacitor of the voltage detection circuit discharged due to the discharge of the battery cell by the discharge circuit can be charged by the time the voltage detection circuit starts (resumes) the voltage detection. This configuration thus provides satisfactory voltage detection accuracy of the voltage detection circuit.

In the battery management device of the above aspect, a detected value of the voltage detection circuit may be limited to between an upper limit voltage and a lower limit voltage, and the cell balancing control unit may be configured to change a range between the upper limit voltage and the lower limit voltage according to the voltage difference when causing the battery cell with the voltage difference equal to or greater than the second threshold to be discharged by the discharge circuit. This configuration can satisfactorily reduce the influence of reduction in voltage detection accuracy of the battery cell due to the discharge of the battery cell by the discharge circuit.

In the battery management device of the above aspect, the reference voltage may be a minimum value of voltages of the battery cells.

A battery management method of another aspect of the present disclosure is a battery management method for managing a battery including a plurality of battery cells and mounted on a vehicle, by using multiple voltage detection circuits each connected to a corresponding one of the battery cells via a pair of voltage detection lines and each configured to detect a voltage of the corresponding battery cell, and multiple discharge circuits each connected to a corresponding one of the battery cells via the pair of voltage detection lines and each configured to discharge the corresponding battery cell. The battery management method includes: acquiring, for each of the battery cells, a voltage difference between the voltage of the battery cell detected by a voltage detection circuit and a reference voltage; and causing the battery cell with the voltage difference equal to or greater than a predetermined first threshold and less than a second threshold that is greater than the first threshold to be discharged by a corresponding discharge circuit while a system of the vehicle is stopped, and causing the battery cell with the voltage difference equal to or greater than the second threshold to be discharged by the corresponding discharge circuit at least either while the system of the vehicle is stopped or while the system of the vehicle is in operation.

This method can thus equalize the voltages of multiple battery cells while reducing the influence of reduction in voltage detection accuracy of the battery cells.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure of the present disclosure will be described with reference to the drawings.

Figure 1:
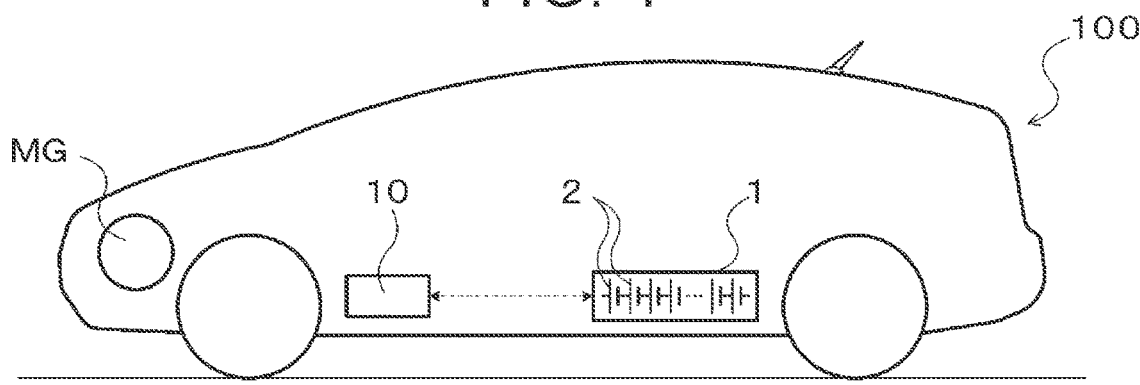
FIG. 1 is a schematic configuration diagram of a vehicle equipped with a battery management device of the present disclosure.

FIG. 1 is a schematic configuration diagram of a vehicle 100 equipped with a battery management device 10 of the present disclosure. The vehicle 100 shown in FIG. 1 is a battery electric vehicle (BEV) or hybrid electric vehicle (HEV, PHEV) including a battery 1 and a motor generator (three-phase alternating current electric motor) MG. The battery 1 is managed by the battery management device 10, and the motor generator MG is connected to the battery 1 via a system main relay (not shown) and a power control device including an inverter etc. (not shown), and can transfer electric power with the battery 1 to output traction power and regenerative braking force.

As shown in the figure, the battery 1 is a so-called high voltage battery including, for example, multiple battery cells 2 connected in series. The battery cells 2 may be distributed and housed in module cases of a plurality of battery modules, not shown, and the battery modules may be connected, for example, in series. The battery cells 2 in each battery module are, for example, ternary, lithium nickel cobalt aluminum oxide (NCA)-based, or lithium iron phosphate-based lithium-ion cells.

Figure 2:
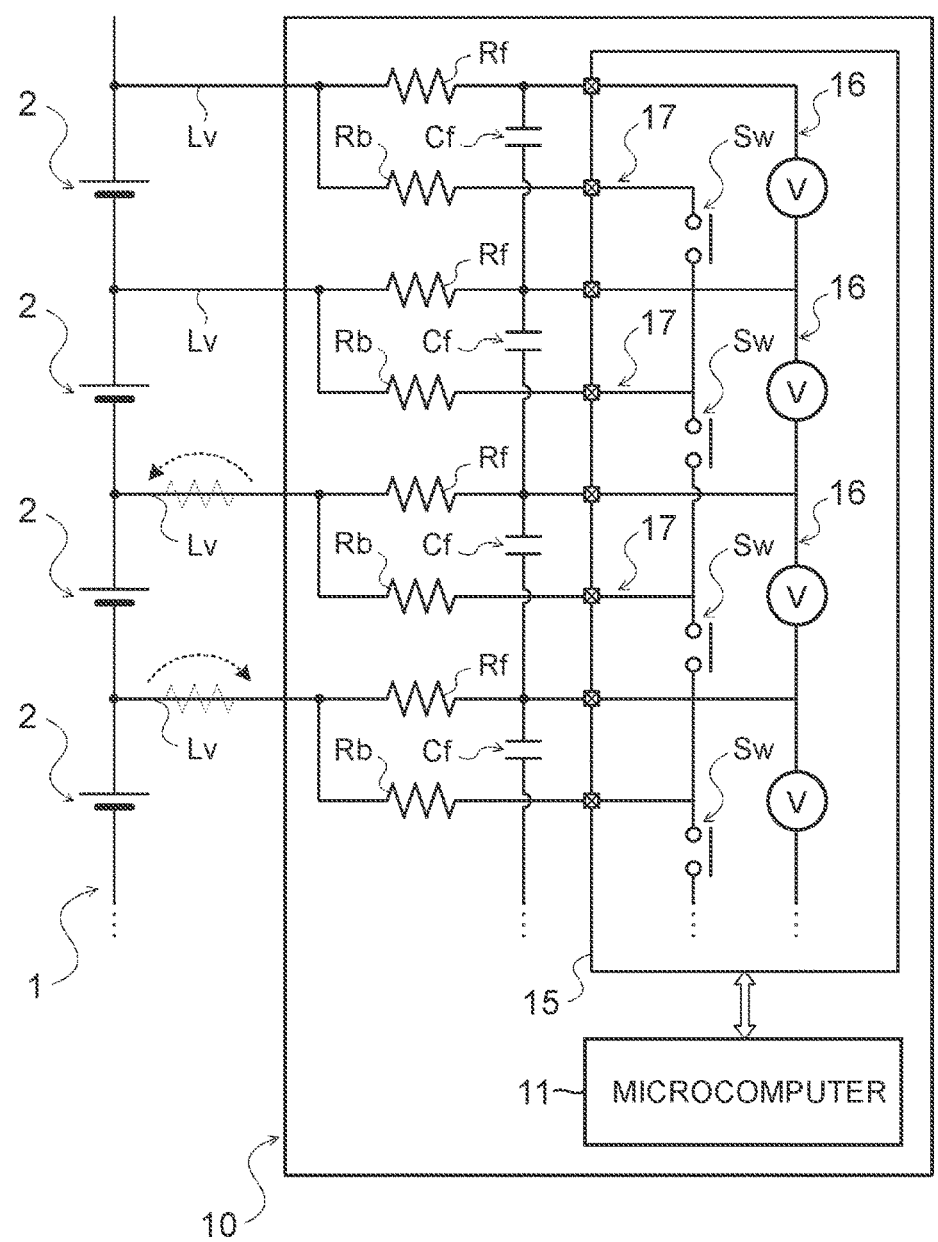
FIG. 2 is a schematic configuration diagram of the battery management device of the present disclosure.

As shown in FIG. 2, the battery management device 10 of the vehicle 100 includes a microcomputer 11, one or more management integrated circuits (ICs) 15, a plurality of filter resistors Rf, a plurality of discharge resistors Rb, and a plurality of filter capacitors Cf. The microcomputer 11 includes a central processing unit (CPU), a read-only memory (ROM), and a random access memory (RAM). Each management IC 15 includes a plurality of switching elements (e.g., transistors) Sw and a plurality of voltage sensors V and is connected to the microcomputer 11. The number of switching elements Sw, the number of voltage sensors V, and the number of filter capacitors Cf in the battery management device 10 are the same as the total number of battery cells 2 in the battery 1. As shown in FIG. 2, the battery management device 10 is connected to the battery cells 2 via a plurality of voltage detection lines Lv. Each voltage detection line Lv is connected to the positive electrode of the battery cell 2 at one end, the negative electrode of the battery cell 2 at the other end, or a node between adjacent ones of the battery cells 2.

Two (a pair of) voltage detection lines Lv connected to both ends of one battery cell 2 are connected to each other via a filter resistor Rf, a filter capacitor Cf, and a filter resistor Rf. That is, a filter capacitor Cf is connected in parallel to each battery cell 2 via a pair of voltage detection lines Lv and two filter resistors Rf. Each voltage sensor V of the management IC 15 detects the voltage between terminals of a corresponding filter capacitor Cf. Accordingly, a pair of voltage detection lines Lv, two filter resistors Rf, a filter capacitor Cf, and a voltage sensor V form a voltage detection circuit 16 that detects the voltage (voltage between terminals) of a corresponding battery cell 2. The battery management device 10 includes a plurality of the voltage detection circuits 16 provided for the battery cells 2 (the same number of voltage detection circuits 16 as the number of battery cells 2).

A discharge resistor Rb is connected to each voltage detection line Lv in parallel with a filter resistor Rf, and a pair of voltage detection lines Lv connected to both ends of one battery cell 2 is connected to a corresponding switching element Sw of the management IC 15 via the discharge resistors Rb. With this configuration, by turning on a switching element Sw, a current from a corresponding battery cell 2 is passed through two discharge resistors Rb to lower the voltage of the battery cell 2. The voltages of the battery cells 2 can thus be equalized. That is, a pair of voltage detection lines Lv, two discharge resistors Rb, and a switching element Sw form a discharge circuit 17 for discharging a corresponding battery cell 2. The battery management device 10 thus include a plurality of discharge circuits 17 provided for the battery cells 2 (the same number of discharge circuits 17 as the number of battery cells 2).

The management IC 15 causes each voltage sensor V to detect the voltage of a corresponding filter capacitor Cf, that is, a corresponding battery cell 2, in a predetermined period (e.g., 150 ms), and completes the voltage detection of each battery cell 2 and a self-diagnosis process of the management IC 15 within a time shorter than the predetermined period (e.g., 100 ms) from the start of the voltage detection. The management IC 15 sends the detected value of each voltage sensor V to the microcomputer 11. The microcomputer 11 limits the detected value of each voltage sensor V of the management IC 15 to between a predetermined upper limit voltage (positive value) and a predetermined lower limit voltage (negative value). The microcomputer 11 calculates the open circuit voltage (OCV) of each battery cell 2 based on the detected value of each voltage sensor V, and calculates the state of charge (SOC) of each battery cell 2 based on the open circuit voltage. In response to a command signal from the microcomputer 11, the management IC 15 controls on and off of a switching element Sw indicated by the command signal.

Figure 3:
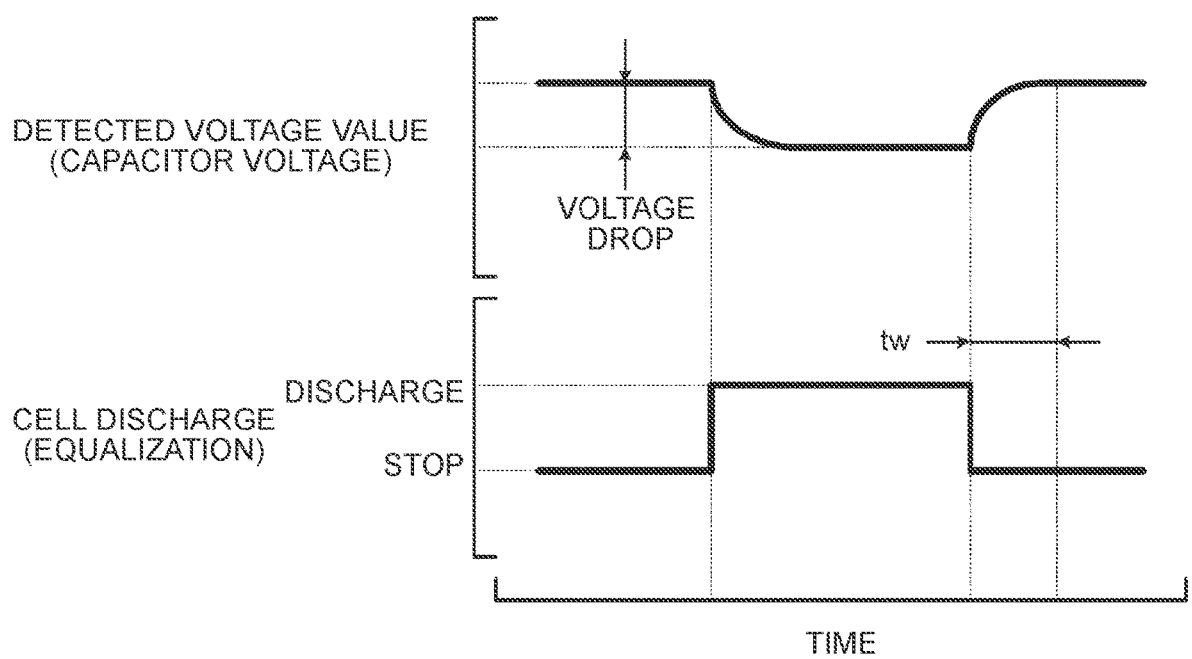
FIG. 3 is a timing chart showing a change in detected value of a voltage sensor when a battery cell is discharged by a discharge circuit of the battery management device of the present disclosure.

In the battery management device 10, a voltage detection circuit 16 and a discharge circuit 17 that correspond to one battery cell 2 share a pair of voltage detection lines Lv as shown in FIG. 2. Accordingly, when a switching element Sw is turned on and a corresponding battery cell 2 is discharged by a corresponding discharge circuit 17, a voltage drop (e.g., about several tens of millivolts) occurs in a corresponding pair of voltage detection lines Lv due to the electrical resistance of each voltage detection line Lv (see dashed lines in FIG. 2), and the detected value of a corresponding voltage sensor V decreases according to the voltage drop as shown in FIG. 3. Due to, for example, the variation in temperature characteristics among the voltage detection lines Lv and the variation among the discharge resistors Rb of the discharge circuits 17, a current (equalizing current) flowing through the discharge circuit 17 and the amount of voltage drop in the voltage detection lines Lv also vary among the discharge circuits 17 and the voltage detection lines Lv, respectively. It is therefore not easy to reduce a voltage detection error of each voltage sensor V due to the voltage drop in the voltage detection lines Lv by correction. When equalizing the voltages of the battery cells 2, it is necessary to consider the influence of reduction in voltage detection accuracy of the battery cells 2 due to the voltage drop in the voltage detection lines Lv.

Figure 4:
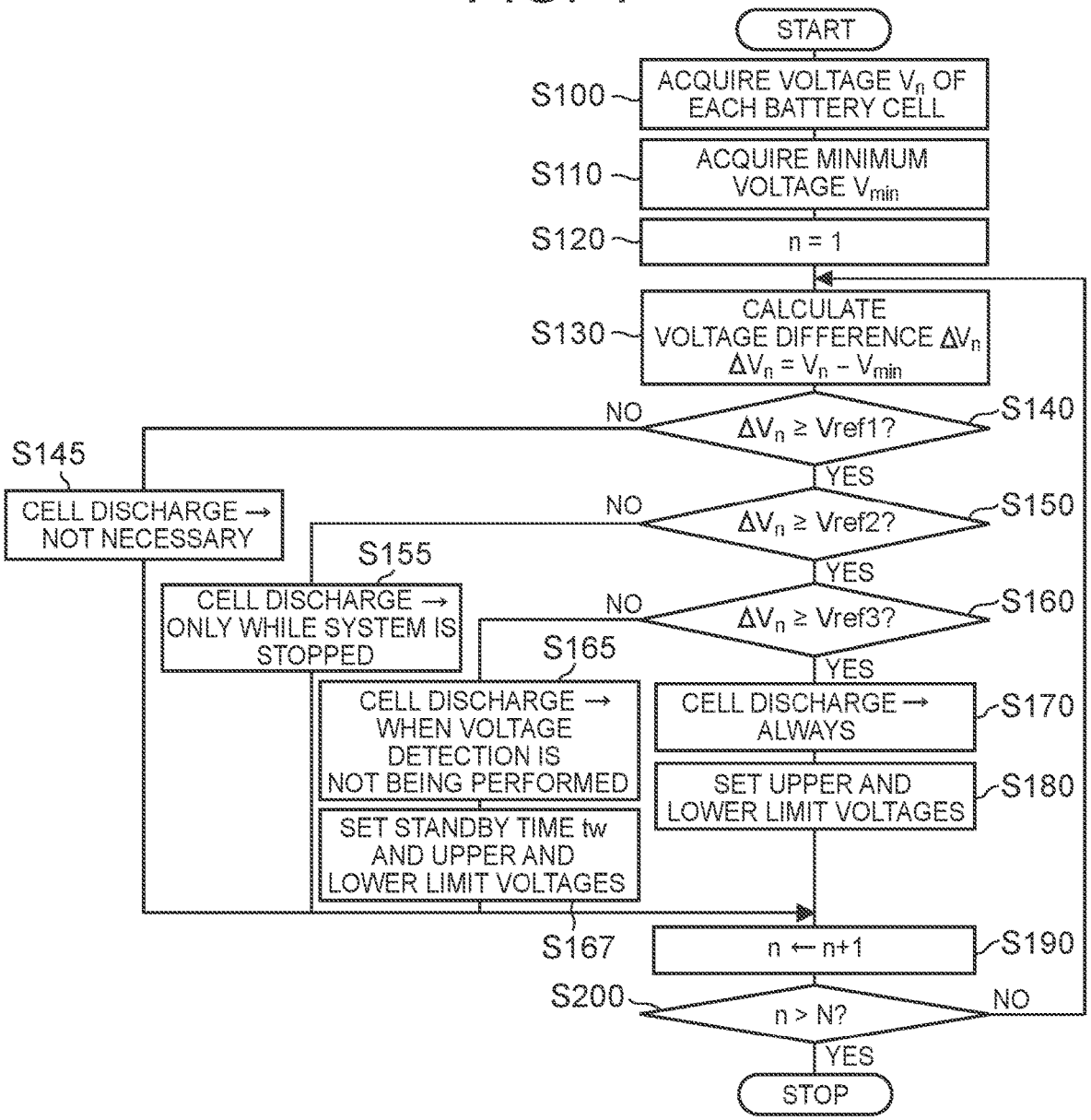
FIG. 4 is a flowchart showing an example of a routine that is executed by the battery management device of the present disclosure.
Figure 5:
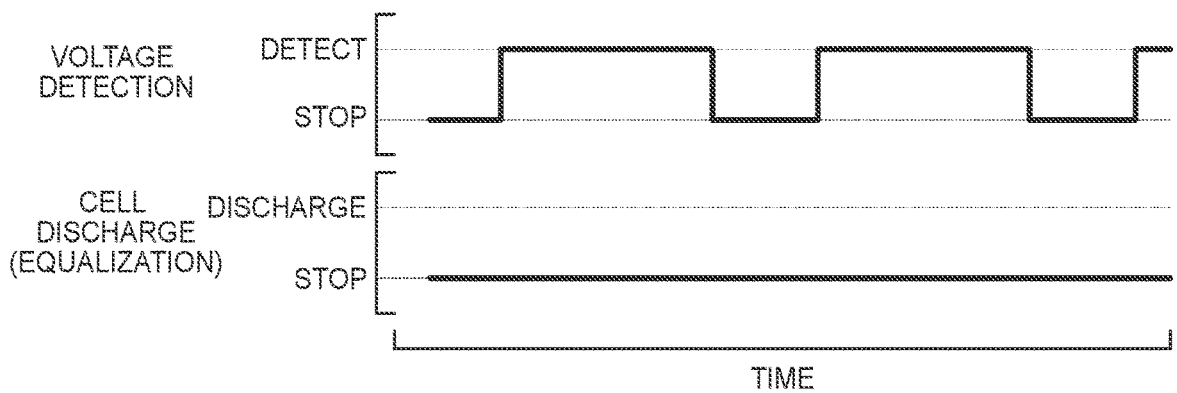
FIG. 5 is a timing chart illustrating a procedure for discharging a battery cell by a discharge circuit of the battery management device of the present disclosure.

Based on this, in order to equalize the voltages of the battery cells 2 while minimizing the influence of reduction in voltage detection accuracy of the battery cells 2 due to the voltage drop in the voltage detection lines Lv, the battery management device 10 executes the routine shown in FIG. 4 to determine, for each battery cell 2, a condition for discharging the battery cell 2 by the discharge circuit 17. The microcomputer 11 that is a cell balancing control unit executes the routine of FIG. 4 at predetermined intervals (very small time intervals) while a system of the vehicle 100 is in operation with a start switch (ignition (IG) switch), not shown, of the vehicle 100 turned on.

At the start of the routine of FIG. 4, the microcomputer 11 (CPU) acquires a voltage $V_n$ of each battery cell 2 detected by each voltage sensor V of the management IC 15 ("n" represents the number of the battery cell 2, and n=1, 2, . . . , N−1, N, where "N" is the total number of battery cells 2) (step S100). The microcomputer 11 also acquires a minimum voltage $V_{min}$ that is the minimum value among the voltages $V_1, V_2, \ldots, V_N$ acquired in step S100 (step S110), and sets the variable n (the number of the battery cell 2) to the value of 1 (step S120).

The microcomputer 11 that is a voltage difference acquisition unit then calculates (acquires) the voltage difference $\Delta V_n$, $(=V_n - V_{min})$ between the voltage $V_n$ of the nth battery cell 2 acquired in step S100 and the minimum voltage $V_{min}$ that is a reference voltage (step S130), and determines whether the voltage difference $\Delta V_n$ is equal to or greater than a predetermined first threshold Vref1 (relatively small positive value) (step S140). When the microcomputer 11 determines that the voltage difference $\Delta V_n$ is less than the first threshold Vref1 (step S140: NO), the microcomputer 11 clears a first discharge flag and a second discharge flag for the nth battery cell 2 in order to indicate that the voltage $V_n$ of the nth battery cell 2 is close to the minimum voltage $V_{min}$ and that it is not necessary to reduce the voltage $V_n$ of the nth battery cell 2 by discharging (step S145).

The first discharge flag is set when the battery cell 2 is to be discharged by the discharge circuit 17 while the system of the vehicle 100 is stopped with the start switch turned off. The second discharge flag is set when the battery cell 2 is to be discharged by the discharge circuit 17 while the system of the vehicle 100 is in operation. After step S145, the microcomputer 11 increments the variable n (step S190) and determines whether the variable n is greater than the total number N of battery cells 2 (step S200). When the microcomputer 11 determines that the variable n is equal to or less than the total number N of battery cells 2 (step S200: NO), the microcomputer 11 repeats step S130 and the subsequent steps.

When the microcomputer 11 determines that the voltage difference $\Delta V_n$ is equal to or greater than the first threshold Vref1 (step S140: YES), the microcomputer 11 determines whether the voltage difference $\Delta V_n$ is equal to or greater than a second threshold Vref2 that is greater than the first threshold Vref1 (step S150). When the microcomputer 11 determines that the voltage difference $\Delta V_n$ is less than the second threshold Vref2 (step S150: NO), the microcomputer 11 determines that it is necessary to reduce the voltage $V_n$ of the nth battery cell 2 by discharging but it is not necessary to discharge the nth battery cell 2 while the system of the vehicle 100 is in operation. The microcomputer 11 thus sets the first discharge flag and clears the second discharge flag for the nth battery cell 2 (step S155). After step S155, the microcomputer 11 increments the variable n (step S190) and determines whether the variable n is greater than the total number N of battery cells 2 (step S200). When the microcomputer 11 determines that the variable n is equal to or less than the total number N of battery cells 2 (step S200: NO), the microcomputer 11 repeats step S130 and the subsequent steps.

When the microcomputer 11 determines that the voltage difference $\Delta V_n$ is equal to or greater than the second threshold Vref2 (step S150: YES), the microcomputer 11 determines whether the voltage difference $\Delta V_n$ is equal to or greater than a third threshold Vref3 that is greater than the second threshold Vref2 (step S160). When the microcomputer 11 determines that the voltage difference $\Delta V_n$ is less than the third threshold Vref3 (step S160: NO), the microcomputer 11 determines that it is necessary to reduce the voltage $V_n$ of the nth battery cell 2 by discharging both while the system of the vehicle 100 is stopped and while the system of the vehicle 100 is in operation. The microcomputer 11 thus sets both of the first and second discharge flags for the nth battery cell 2 (step S165).

When the microcomputer 11 determines that the voltage difference $\Delta V_n$ is less than the third threshold Vref3 (step S160: NO), the microcomputer 11 also sets a discharge temporary prohibition flag for the nth battery cell 2 in step S165 in order to provide enough voltage detection accuracy of each voltage sensor V of the management IC 15. When the discharge temporary prohibition flag is set, discharging of the battery cell 2 by the discharge circuit 17 is prohibited during the voltage detection of the battery cell 2 and the self-diagnosis process of the management IC 15 while the system of the vehicle 100 is in operation, in order to provide enough voltage detection accuracy of each voltage sensor V.

Subsequently, the microcomputer 11 sets a standby time tw and an upper limit voltage and lower limit voltage for limiting the detected value of the voltage sensor V (step S167). The standby time tw is the amount of time that should be provided between the end of discharging of the battery cell 2 by the discharge circuit 17 and the start (resumption) of the voltage detection of the battery cell 2 by the voltage sensor V while the system of the vehicle 100 is in operation. That is, when a switching element Sw of the management IC 15 is turned on and a corresponding battery cell 2 is discharged by a corresponding discharge circuit 17, a voltage drop occurs in a corresponding pair of voltage detection lines Lv. Therefore, the filter capacitor Cf of a corresponding voltage detection circuit 16 that shares the voltage detection lines Lv with this discharge circuit 17 is discharged to a voltage determined by both a time constant that is based on the capacitance of the filter capacitor Cf and the resistance value of the filter resistors Rf and the ON time of the switching element Sw.

Therefore, in order to provide enough voltage detection accuracy of the voltage sensor V, it is necessary to charge this filter capacitor Cf with the amount of power corresponding to the amount of power discharged from the filter capacitor Cf during discharging of the battery cell 2 by the discharge circuit 17, by the time the voltage sensor V starts (resumes) the voltage detection. Therefore, in step S167, the microcomputer 11 sets the standby time tw as the time for charging the filter capacitor Cf with the amount of power corresponding to the amount of power discharged from the filter capacitor Cf due to the discharge of the battery cell 2. In the present embodiment, the standby time tw that is set in step S167 is a fixed value that is determined in advance based on, for example, the capacitance of the filter capacitor Cf and the resistance value of the filter resistors Rf of the voltage detection circuit 16 and the time until the next time the voltage detection of the voltage sensor V is started after the voltage detection of the voltage sensor V and the self-diagnosis process of the management IC 15 end.

In step S167, the microcomputer 11 sets the upper limit voltage to a positive value smaller than a value that is used when the battery cell 2 is not discharged by the discharge circuit 17, and sets the lower limit voltage to a negative value greater than a value that is used when the battery cell 2 is not discharged by the discharge circuit 17. The microcomputer 11 thus narrows the range between the upper and lower limit voltages. After step S167, the microcomputer 11 increments the variable n (step S190) and determines whether the variable n is greater than the total number N of battery cells 2 (step S200). When the microcomputer 11 determines that the variable n is equal to or less than the total number N of battery cells 2 (step S200: NO), the microcomputer 11 repeats step S130 and the subsequent steps.

When the microcomputer 11 determines that the voltage difference $\Delta V_n$ is equal to or greater than the third threshold Vref3 (step S160: YES), the microcomputer 11 determines that it is necessary to reduce the voltage $V_n$ of the nth battery cell 2 by discharging both while the system of the vehicle 100 is stopped and while the system of the vehicle 100 is in operation. The microcomputer 11 thus sets both of the first and second discharge flags for the nth battery cell 2 (step S170). When the voltage difference $\Delta V_n$ is equal to or greater than the third threshold Vref3, the microcomputer 11 also clears the discharge temporary prohibition flag for the nth battery cell 2 in step S170 in order to preferentially discharge the battery cell 2, namely preferentially equalize the voltages of the battery cells 2, over providing enough voltage detection accuracy of each voltage sensor V of the management IC 15.

The microcomputer 11 also sets the upper limit voltage to a positive value smaller than the value set in step S167, and sets the lower limit voltage to a negative value greater than the value set in step S167 (step S180). As a result, when the voltage difference $\Delta V_n$ is equal to or greater than the third threshold Vref3, the range between the upper and lower limit voltages is further narrowed than when it is determined that the voltage difference $\Delta V_n$ is equal to or greater than the second threshold Vref2 and less than the third threshold Vref3. After step S180, the microcomputer 11 increments the variable n (step S190) and determines whether the variable n is greater than the total number N of battery cells 2 (step S200). When the microcomputer 11 determines that the variable n is equal to or less than the total number N of battery cells 2 (step S200: NO), the microcomputer 11 repeats step S130 and the subsequent steps.

When the above routine of FIG. 4 is executed and the condition for discharging the battery cell 2 by the discharge circuit 17 is determined for all of the (N) battery cells 2, it is determined in step S200 that the variable n is greater than the total number N of battery cells 2. When the microcomputer 11 that is the cell balancing control unit determines that the variable n is greater than the total number N of battery cells 2 (step S200: YES), the microcomputer 11 ends the routine of FIG. 4, and together with the management IC 15 equalizes the voltages of the battery cells 2 to the minimum voltage $V_{min}$ according to the condition for discharging the battery cell 2 by the discharge circuit 17 as determined for each battery cell 2.

That is, as shown in FIG. 4, the microcomputer 11 does not cause any battery cell 2 whose voltage difference $\Delta V_n$ from the minimum voltage $V_{min}$ that is the reference voltage is equal to or greater than the predetermined first threshold Vref1 and less than the second threshold Vref2 to be discharged by a corresponding discharge circuit 17 while the system of the vehicle 100 is in operation, and causes such a battery cell 2 to be discharged by the corresponding discharge circuit 17 while the system of the vehicle 100 is stopped with the start switch turned off, according to the settings of the first and second discharge flags in step S155 of FIG. 4. Accordingly, the opportunity to discharge the battery cell 2 having a relatively small voltage difference $\Delta V_n$ from the minimum voltage $V_{min}$ by the discharge circuit 17 is limited to while the system of the vehicle 100 is stopped such as when the vehicle 100 is not in use or when the battery 1 is not charged using external charging equipment (when the system main relay is open). When performing the process of discharging the battery cell 2 while the system is stopped, the system main relay is opened, and power is supplied only to those devices that are necessary to perform the discharge process, such as the battery management device 10.

The microcomputer 11 causes any battery cell 2 whose voltage difference $\Delta V_n$ from the minimum voltage $V_{min}$ is equal to or greater than the second threshold Vref2 to be discharged by a corresponding discharge circuit 17 at least either while the system of the vehicle 100 is stopped or while the system of the vehicle 100 is in operation, according to the settings of the first and second discharge flags in step S165 or S170 of FIG. 4. For example, when the system of the vehicle 100 is still in operation after the routine of FIG. 4 ends, the microcomputer 11 causes any battery cell 2 whose voltage difference $\Delta V_n$ from the minimum voltage $V_{min}$ is equal to or greater than the second threshold Vref2 to be discharged by a corresponding discharge circuit 17. After the start switch is turned off, the microcomputer 11 causes any battery cell 2 whose voltage difference $\Delta V_n$ is still equal to or higher than the second threshold Vref2 to be discharged by a corresponding discharge circuit 17 while the system of the vehicle 100 is stopped.

Figure 6:
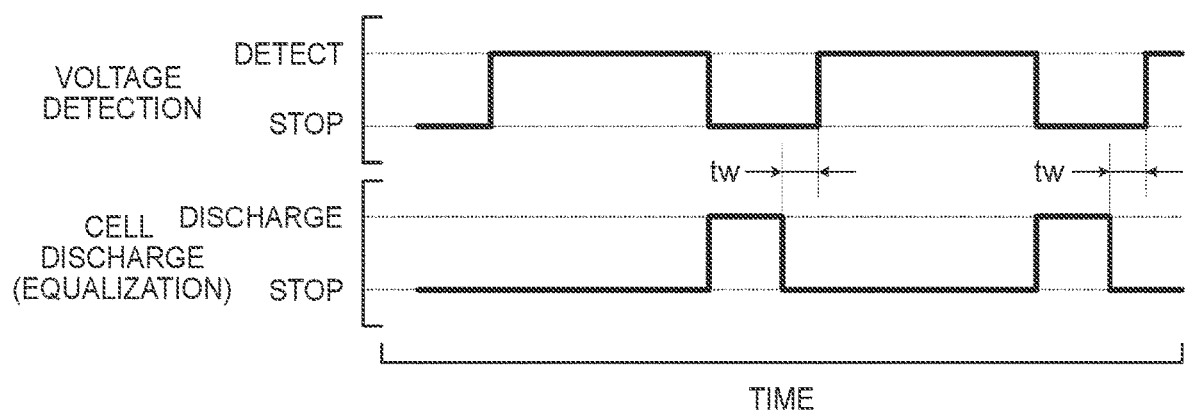
FIG. 6 is a timing chart illustrating a procedure for discharging a battery cell by a discharge circuit of the battery management device of the present disclosure.
Figure 7:
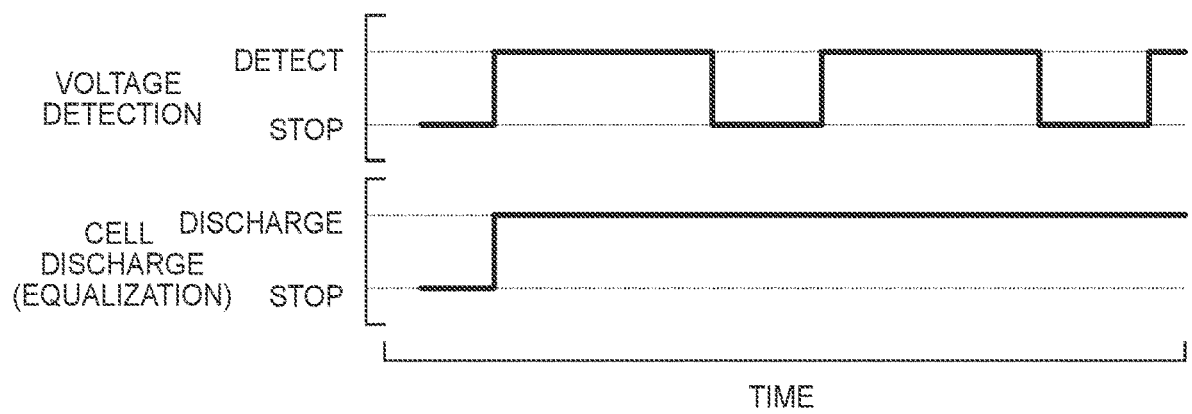
FIG. 7 is a timing chart illustrating a procedure for discharging a battery cell by a discharge circuit of the battery management device of the present disclosure.

As shown in FIG. 6, the microcomputer 11 causes any battery cell 2 whose voltage difference $\Delta V_n$ from the minimum voltage $V_{min}$ is equal to or greater than the second threshold Vref2 and less than the third threshold Vref3 to be discharged by a corresponding discharge circuit 17 when a corresponding voltage sensor V (voltage detection circuit 16) is not detecting the voltage while the system of the vehicle 100 is in operation, according to the setting of the discharge temporary prohibition flag in step S165 of FIG. 4. As shown in FIG. 7, the microcomputer 11 causes any battery cell 2 whose voltage difference $\Delta V_n$ from the minimum voltage $V_{min}$ is equal to or greater than the third threshold Vref3 to be discharged by a corresponding discharge circuit 17 while the system of the vehicle 100 is in operation regardless of whether a corresponding voltage sensor V (voltage detection circuit 16) is detecting the voltage, according to the setting of the discharge temporary prohibition flag in step S170 of FIG. 4. As a result, as can be seen from FIGS. 6 and 7, when the battery cell 2 whose voltage difference $\Delta V_n$ from the minimum voltage $V_{min}$ is equal to or greater than the second threshold Vref2 is discharged by the discharge circuit 17 while the system of the vehicle 100 is in operation, the discharge time of the battery cell 2 with a large voltage difference $\Delta V_n$ ($\Delta V_n \geq$Vref3) is longer than the discharge time of the battery cell 2 with a small voltage difference $\Delta V_n$ ($\Delta V_n <$Vref3) (the same applies to when the battery cell 2 whose voltage difference $\Delta V_n$ from the minimum voltage $V_{min}$ is equal to or greater than the second threshold Vref2 is discharged by the discharge circuit 17 while the system of the vehicle 100 is stopped).

As shown in FIG. 6, the microcomputer 11 causes any battery cell 2 whose voltage difference $\Delta V_n$ is equal to or greater than the second threshold Vref2 and less than the third threshold Vref3 to be discharged by a corresponding discharge circuit 17 from when the voltage detection of a corresponding voltage sensor V (voltage detection circuit 16) (and the self-diagnosis process) ends until the standby time tw set in step S167 before the next time the voltage sensor V (voltage detection circuit 16) starts (resumes) the voltage detection. Accordingly, after the battery cell 2 is discharged by the discharge circuit 17, a corresponding filter capacitor Cf can be charged with the amount of power corresponding to the amount of power discharged from the filter capacitor Cf due to the discharge of the battery cell 2 by the time the voltage sensor V resumes the voltage detection.

As described above, the battery management device 10 of the vehicle 100 includes multiple voltage detection circuits 16 each connected to a corresponding one of a plurality of battery cells 2, and multiple discharge circuits 17 each connected to a corresponding one of the battery cells 2. A voltage detection circuit 16 and a discharge circuit 17 that correspond to one battery cell 2 share a pair of voltage detection lines Lv. Therefore, when a battery cell 2 is discharged by a corresponding discharge circuit 17 to reduce the voltage of the battery cell 2 to the minimum voltage $V_{min}$ that is the reference voltage, a voltage drop occurs in a corresponding pair of voltage detection lines Lv due to the electrical resistance of each voltage detection line Lv, and the voltage detection accuracy of the battery cell 2 decreases due to the voltage drop.

Based on this, the microcomputer 11 causes any battery cell 2 whose voltage difference $\Delta V_n$ between the voltage of the battery cell 2 and the minimum voltage $V_{min}$ acquired in step S130 of FIG. 4 is equal to or greater than the predetermined first threshold Vref1 and less than the second threshold Vref2 that is greater than the first threshold Vref1 to be discharged by a corresponding discharge circuit 17 while the system of the vehicle 100 is stopped (step S155). The microcomputer 11 causes any battery cell 2 whose voltage difference $\Delta V_n$ is equal to or greater than the second threshold Vref2 to be discharged by a corresponding discharge circuit 17 at least either while the system of the vehicle 100 is stopped or while the system of the vehicle 100 is in operation (step S165, S170).

Accordingly, the opportunity to discharge the battery cell 2 having a relatively small voltage difference $\Delta V_n$ from the minimum voltage $V_{min}$ by the discharge circuit 17 is limited to while the system of the vehicle 100 is stopped such as when the vehicle 100 is not in use or when the battery 1 is not charged using external charging equipment. This reduces the influence of reduction in voltage detection accuracy of the battery cell 2 while the system of the vehicle 100 is in operation. Moreover, the above configuration provides enough opportunities to discharge the battery cell 2 having a relatively large voltage difference $\Delta V_n$ from the minimum voltage $V_{min}$, so that the voltages of the battery cells 2 can be equalized. As a result, the battery management device 10 can equalize the voltages of the battery cells 2 while reducing the influence of reduction in voltage detection accuracy of the battery cells 2.

When the microcomputer 11 causes any battery cell 2 whose voltage difference $\Delta V_n$ from the minimum voltage $V_{min}$ is equal to or greater than the second threshold Vref2 to be discharged by a corresponding discharge circuit 17, the discharge time of the battery cell 2 with the voltage difference $\Delta V_n$ equal to or greater than the third threshold Vref3 that is greater than the second threshold Vref2 is longer than the discharge time of the battery cell 2 with a small voltage difference $\Delta V_n$ that is less than the third threshold Vref3. That is, the microcomputer 11 causes the battery cell 2 with the voltage difference $\Delta V_n$ equal to or greater than the second threshold to be discharged by the discharge circuit 17 in such a way that a discharge time of the battery cell 2 is longer as the voltage difference $\Delta V_n$ is larger. This can reduce the chance that discharging of the battery cell 2 by the discharge circuit 17 and the voltage detection of the voltage detection circuit 16 (voltage sensor V) will be performed at the same time (in parallel) while the system of the vehicle 100 is in operation, and can satisfactorily reduce the influence of reduction in voltage detection accuracy of the battery cell 2.

That is, in the battery management device 10, each voltage detection circuit 16 (voltage sensor V) detects the voltage of a corresponding battery cell 2 in the predetermined period, and the microcomputer 11 causes any battery cell 2 whose voltage difference $\Delta V_n$ is equal to or greater than the second threshold Vref2 and less than the third threshold Vref3 to be discharged by a corresponding discharge circuit 17 when a corresponding voltage detection circuit 16 is not detecting the voltage while the system of the vehicle 100 is in operation. The microcomputer 11 also causes any battery cell 2 whose voltage difference $\Delta V_n$ is equal to or greater than the third threshold Vref3 to be discharged by a corresponding discharge circuit 17 while the system of the vehicle 100 is in operation regardless of whether a corresponding voltage detection circuit 16 is detecting the voltage. This configuration can minimize the influence of reduction in voltage detection accuracy of the battery cell 2 when causing the battery cell 2 whose voltage difference $\Delta V_n$ from the minimum voltage $V_{min}$ is equal to or greater than the second threshold Vref2 to be discharged by the discharge circuit 17 while the system of the vehicle 100 is in operation, and can facilitate equalization of the battery cells 2.

Each voltage detection circuit 16 of the battery management device 10 includes filter resistors Rf connected in series with a corresponding battery cell 2, a filter capacitor Cf connected in parallel with the battery cell 2, and a voltage sensor V that detects the voltage between the terminals of the filter capacitor Cf. The microcomputer 11 causes any battery cell 2 whose voltage difference $\Delta V_n$ is equal to or greater than the second threshold Vref2 and less than the third threshold Vref3 to be discharged by a corresponding discharge circuit 17 from when the voltage detection of a corresponding voltage sensor V (voltage detection circuit 16) ends until the standby time tw set in step S167 before the next time the voltage sensor V starts (resumes) the voltage detection. Accordingly, the filter capacitor Cf of the voltage detection circuit 16 discharged due to the discharge of the battery cell 2 by the discharge circuit 17 can be charged by the time the voltage sensor V starts the voltage detection. This configuration thus provides satisfactory voltage detection accuracy of the voltage sensor V.

The battery management device 10 also calculates the SOC etc. of each battery cell 2 based on the detected value of a corresponding voltage sensor V (voltage detection circuit 16) that is limited between the upper limit voltage and the lower limit voltage. When the microcomputer 11 causes the battery cell 2 whose voltage difference $\Delta V_n$ from the minimum voltage $V_{min}$ is equal to or greater than the second threshold Vref2 to be discharged by the discharge circuit 17, the microcomputer 11 changes the range between the upper limit voltage and the lower limit voltage according to the voltage difference $\Delta V_n$ (step S167, S180). This configuration can satisfactorily reduce the influence of reduction in voltage detection accuracy of the battery cells 2 due to the discharge of the battery cells 2 by the discharge circuits 17.

For example, the average of the voltages of the battery cells 2 may be used as the reference voltage instead of the minimum voltage $V_{min}$ of the battery cells 2 in step S130 of FIG. 4. In step S130 of FIG. 4, instead of calculating the difference between the voltage of each battery cell 2 and the reference voltage, the SOC difference between an estimated SOC of each battery cell 2 and a reference SOC (e.g., the minimum value among the estimated SOCs of the battery cells 2) may be calculated. In steps S140 to S160 of FIG. 4, this SOC difference may be compared with first to third thresholds. Such a form is particularly suitable for the battery 1 whose battery cells 2 are lithium iron phosphate-based lithium-ion cells (lithium iron phosphate cells). In step S167 of FIG. 4, instead of setting the standby time tw to the fixed value, the standby time tw may be changed according to the voltage difference $\Delta V_n$ etc.

It should be understood that the disclosure of the present disclosure is not limited to the above embodiment, and that various modifications can be made within the scope of the present disclosure. The above embodiment is merely a specific form of the disclosure described in the "SUMMARY" section, and is not intended to limit the elements of the disclosure described in the "SUMMARY" section.

The disclosure of the present disclosure is applicable in, for example, the manufacturing field of battery management devices that manage a battery including a plurality of battery cells and mounted on a vehicle.

What is claimed is:

1. A battery management device that manages a battery including a plurality of battery cells and mounted on a vehicle, the battery management device comprising:
   multiple voltage detection circuits each connected to a corresponding one of the battery cells via a pair of voltage detection lines, and each configured to detect a voltage of the corresponding battery cell;
   multiple discharge circuits each connected to a corresponding one of the battery cells via the pair of voltage detection lines, and each configured to discharge the corresponding battery cell;
   a voltage difference acquisition unit configured to acquire, for each of the battery cells, a voltage difference between the voltage of the battery cell detected by a voltage detection circuit and a reference voltage; and
   a cell balancing control unit configured to cause the battery cell with the voltage difference equal to or greater than a predetermined first threshold and less than a second threshold that is greater than the first threshold to be discharged by a corresponding discharge circuit while a system of the vehicle is stopped, and configured to cause the battery cell with the voltage difference equal to or greater than the second threshold to be discharged by the corresponding discharge circuit at least either while the system of the vehicle is stopped or while the system of the vehicle is in operation.

2. The battery management device according to claim 1, wherein the cell balancing control unit is configured to cause the battery cell with the voltage difference equal to or greater than the second threshold to be discharged by the discharge circuit in such a way that a discharge time of the battery cell is longer as the voltage difference is larger.

3. The battery management device according to claim 1, wherein:
   the voltage detection circuit is configured to detect the voltage of the corresponding battery cell in a predetermined period; and
   the cell balancing control unit is configured to cause the battery cell with the voltage difference equal to or greater than the second threshold and less than a third threshold that is greater than the second threshold to be discharged by the discharge circuit when the voltage detection circuit is not detecting the voltage while the system of the vehicle is in operation, and is configured to cause the battery cell with the voltage difference equal to or greater than the third threshold to be discharged by the discharge circuit while the system of the vehicle is in operation regardless of whether the voltage detection circuit is detecting the voltage.

4. The battery management device according to claim 3, wherein:
   the voltage detection circuit includes a resistor connected in series with the battery cell, a capacitor connected in parallel with the battery cell, and a voltage sensor that detects a voltage between terminals of the capacitor; and
   the cell balancing control unit is configured to cause the battery cell with the voltage difference equal to or greater than the second threshold and less than the third threshold to be discharged by the discharge circuit from when voltage detection of the voltage detection circuit ends until before the voltage detection circuit starts the voltage detection.

5. The battery management device according to claim 1, wherein:
   the cell balancing control unit is configured to change a range between an upper limit voltage and a lower limit voltage that the voltage detection circuit is limited to detect according to the voltage difference when causing the battery cell with the voltage difference equal to or greater than the second threshold to be discharged by the discharge circuit.

6. The battery management device according to claim 1, wherein the reference voltage is a minimum value of voltages of the battery cells.

7. A battery management method for managing a battery including a plurality of battery cells and mounted on a vehicle, by using multiple voltage detection circuits each connected to a corresponding one of the battery cells via a pair of voltage detection lines and each configured to detect a voltage of the corresponding battery cell, and multiple discharge circuits each connected to a corresponding one of the battery cells via the pair of voltage detection lines and each configured to discharge the corresponding battery cell, the battery management method comprising:
   acquiring, for each of the battery cells, a voltage difference between the voltage of the battery cell detected by a voltage detection circuit and a reference voltage; and
   causing the battery cell with the voltage difference equal to or greater than a predetermined first threshold and less than a second threshold that is greater than the first threshold to be discharged by a corresponding discharge circuit while a system of the vehicle is stopped, and causing the battery cell with the voltage difference equal to or greater than the second threshold to be discharged by the corresponding discharge circuit at least either while the system of the vehicle is stopped or while the system of the vehicle is in operation.

* * * * *